US006276499B1

(12) United States Patent
Satou

(10) Patent No.: US 6,276,499 B1
(45) Date of Patent: Aug. 21, 2001

(54) HYDRAULIC SHOCK ABSORBERS

(75) Inventor: Masahiro Satou, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 08/855,104

(22) Filed: May 13, 1997

(30) Foreign Application Priority Data

May 15, 1996 (JP) .................................................. 8-120324

(51) Int. Cl.[7] ........................................................ F16F 9/34
(52) U.S. Cl. .................................. 188/322.15; 188/282.5
(58) Field of Search ........................... 188/322.15, 282.5, 188/282.6, 317, 322.22

(56) References Cited

U.S. PATENT DOCUMENTS

| 4,485,900 | * | 12/1984 | Kato et al. | .................. 188/282.5 |
| 4,724,937 | * | 2/1988 | Fannin et al. | .................. 188/319 |
| 4,972,929 | | 11/1990 | Ivers et al. | . |
| 5,085,300 | * | 2/1992 | Kato et al. | .................. 188/322.15 |
| 5,706,919 | * | 1/1998 | Kruckemeyer et al. | .................. 188/299 |

FOREIGN PATENT DOCUMENTS

| 2103153 | 8/1972 | (DE) . |
| 0632212 | 1/1995 | (EP) . |
| 1367698 | 11/1964 | (FR) . |
| 2106220 | 4/1983 | (GB) . |
| 2157808 | 10/1985 | (GB) . |
| 2226620 | 7/1990 | (GB) . |

* cited by examiner

Primary Examiner—Robert J. Oberleitner
Assistant Examiner—Pamela J. Rodriguez
(74) Attorney, Agent, or Firm—Ernest A. Beutler

(57) ABSTRACT

A hydraulic shock absorber having an improved shim arrangement for controlling the damping curve of the shock absorber. This shim element is configured so that it does not extend beyond the peripheral edges of the apertures which it controls and which diameter can be selected.

5 Claims, 4 Drawing Sheets

HYDRAULIC SHOCK ABSORBERS

BACKGROUND OF THE INVENTION

This invention relates to a hydraulic shock absorber and more particularly to an improved, variable rate, hydraulic shock absorber.

There is a very popular type of hydraulic shock absorber wherein damping forces are obtained by positioning a piston in a sliding cylinder and to divide the cylinder into a pair of oppositely disposed fluid chambers. The piston is provided with two series of apertures each of which permits flow from one chamber to the other. By employing a plurality of stacked type plate valves on the opposite sides of the piston, the flow through the respective apertures can be controlled.

This type of device is quite effective, but as shown in the dotted line view of FIG. 1 has a generally linear damping force characteristic with respect to displacement or piston speed. That is, as the speed of the piston increases, the damping force increases linearly as shown by the curve D. Although such devices are effective, they tend to require large suspension travels in order to achieve the desired ride characteristics.

There has been proposed, therefore, a type of damping arrangement as shown in FIG. 2. This type of damping arrangement gives a speed to damping force characteristic as shown by the solid line curve C in FIG. 1. During the original portion of the suspension travel, there is a relatively high damping force as indicated by the line $C_1$. At a particular point P, which occurs at the piston speed Vo, the damping characteristic becomes less progressive in nature as seen by the curve $C_2$. This provides very effective damping under small loads and still permits a soft ride without necessitating large suspension travel.

The type of construction employed to achieve the damping curve C in FIG. 1 is obtained by the structure as shown in FIG. 2. As seen in this figure, there is a piston rod 11 which is connected to one of the suspended elements in a manner which will be described in more detail later when the preferred embodiment is described. A piston 12 is connected in a suitable manner to the piston rod and is provided with a first series of apertures 13 that are spaced so that their axes lie on a circle set at a fixed distance from the axis of the piston rod 12. The openings 13 permit flow from the chamber which exists above the piston 12 to a chamber 14 that is formed below it by an associated cylinder.

The flow through the apertures 13 is controlled by a stack plate type valve, indicated generally by the reference numeral 15 and which has a plurality of plate type valve elements 15a, 15b, 15c, 15d and 15e. These valve elements 15a through 15e are held on the piston rod by a retainer ring 16 in a manner known in the art. The structure as thus far described is like the conventional structure and would provide a damping force as shown by the curve D in FIG. 1.

In order to provide the knee-type damping curve C of FIG. 1, a pre-load shim 17 is interposed between the plate type valve elements 15a and 15b. This shim 17 is selected of a desired thickness so as to deflect the valve plates 15b, 15c, 15d and 15e as shown in FIG. 2. This, in effect, gives a pre-load that biases the valve plate 15a in its closed position.

A small bypass passage 18 is formed in the piston 12 and communicates the passages 13 with the chamber 14 bypassing the valve 15. Thus, during initial upward movement of the piston 12 relative to the associated cylinder, the valve 15 will maintain in a closed position and the size of the orifice 18 will determine the shape of the damping curve $C_1$. However, at the point P when the piston velocity reaches the velocity Vo, sufficient pressure will be generated so as to overcome the pre-load on the valve element 15a and it will open and the damping curve $C_2$ will then result.

As may be seen, the shim 17 in the conventional structure is disposed so that it is radially outwardly of the series of apertures 13 and hence the pressure or piston velocity at which the valve element 15 will open is fixed within a limited range. This is not desirable because it would be preferred to be able to obtain a damping curve that would have more adjustability so as to suit varying conditions.

It is, therefore, a principal object of this invention to provide an improved variable rate shock absorber of this type.

It is a further object of this invention to provide a shock absorber having a rate that may be varied in a greater range than the prior art type of constructions.

SUMMARY OF THE INVENTION

This invention is adapted to be embodied in a hydraulic shock absorber of the type having a cylinder forming a cylinder bore. A piston is slidably supported in the cylinder bore and divide the cylinder bore into a pair of opposite fluid chambers. A piston rod extends from the piston through one end of the cylinder for attachment to one element of a suspension system. The cylinder is connected to the other element of the suspension system so that when the two suspended elements move relative to each other, the piston will traverse the cylinder bore. First and second series of apertures are formed in the piston for permitting flow between the fluid chambers in opposite directions. First and second plate type valves are affixed to the piston in valving relationship to the respective series of apertures for controlling the pressure at which the apertures are opened and hence the damping force. Each series of plate type valves is comprised of a plurality of valve plates that are held in stacked relationship. At least one of these plate type valves includes a shim that is disposed between the valve plates for pre-loading the valve plates disposed between the shim and the piston. The shim is disposed so that it does not extend beyond the outer periphery of the apertures with which it is associated.

DETAILED DESCRIPTION OF THE PREFERRED EMBODIMENTS OF THE INVENTION

Figure 3:
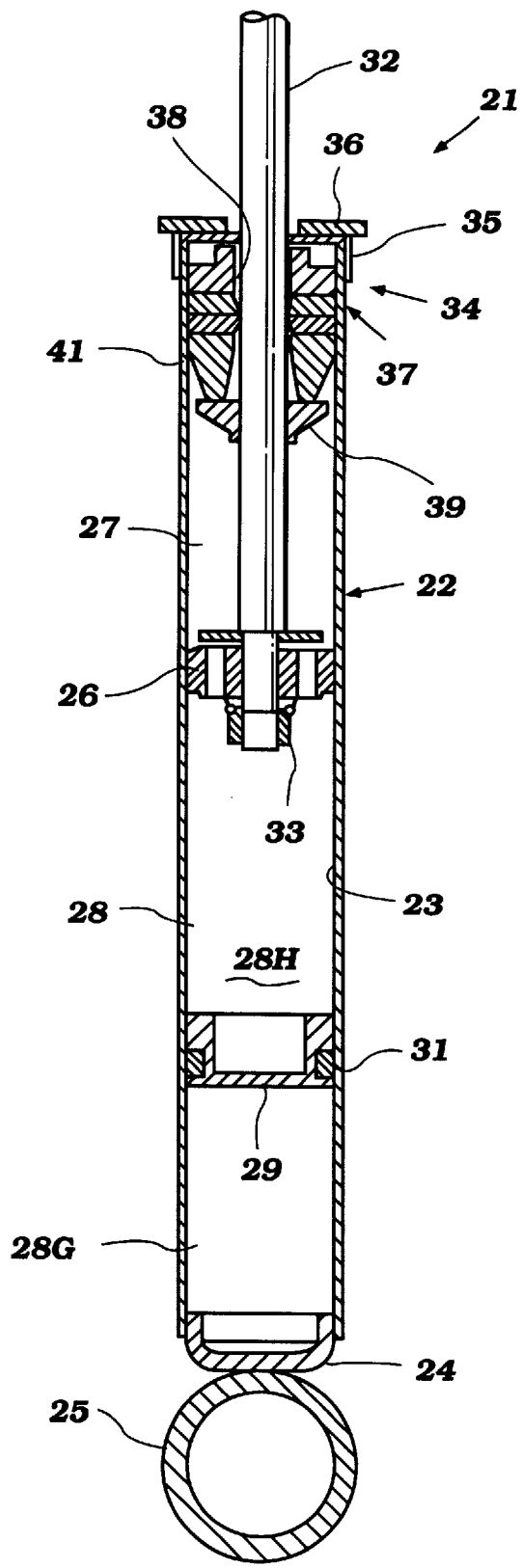
FIG. 3 is an enlarged cross-sectional view taken through a hydraulic shock absorber constructed in accordance with an embodiment of the invention.

Referring now in detail to the drawings and initially to FIG. 3, a hydraulic shock absorber constructed in accordance with an embodiment of the invention is identified generally by the reference numeral 21. This hydraulic shock absorber 21 is comprised of an outer cylinder 22 that defines a cylinder bore 23. One end of the cylinder bore 23 is closed by a closure plug 24 that forms a trunion 25 to provide a pivotal connection to a first element of a suspension system.

The shock absorber 21 is of a type which may be utilized with motor vehicles and in such an arrangement the trunion 25 would provide a connection to a vehicle suspension element that supports a vehicle wheel for rotation.

Figure 4:
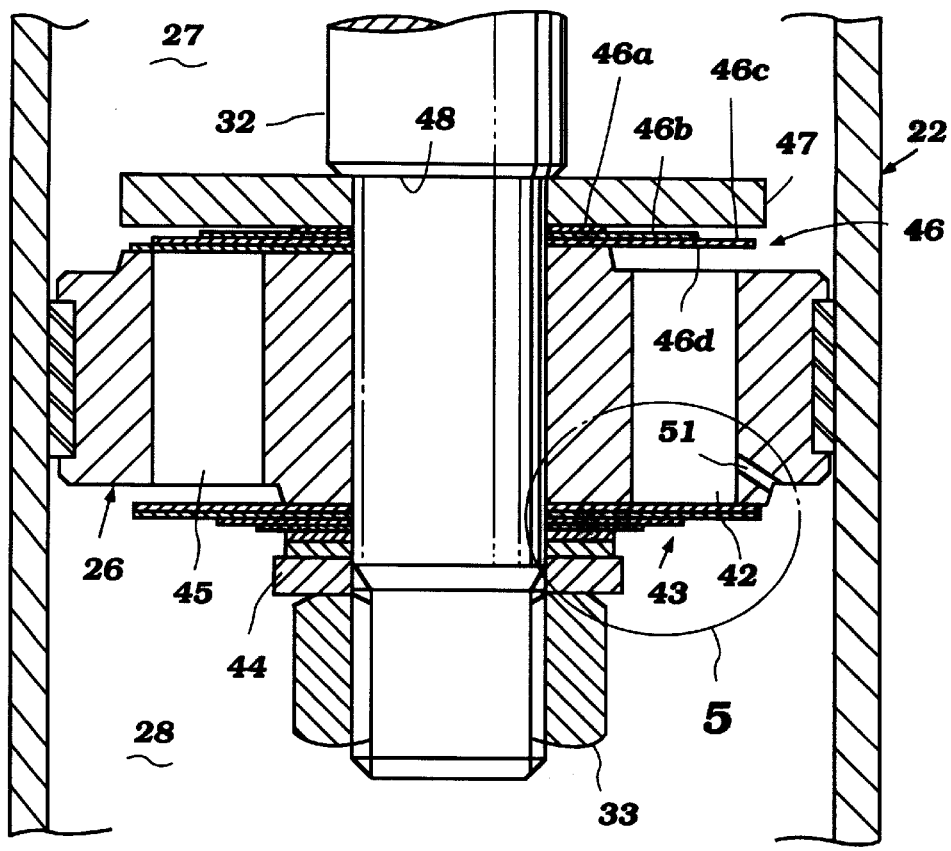
FIG. 4 is a further enlarged cross-sectional view showing the piston and the damping arrangement associated therewith.

A piston indicated generally by the reference numeral 26 and having a construction best shown in FIG. 4 is supported within the cylinder bore 23 in a manner to be described. The piston 26 divides the interior of the cylinder 22 into an upper fluid chamber 27 and a lower fluid chamber 28. The lower fluid chamber 28 is further divided into a hydraulic chamber 28H and a gas chamber 28G by a floating piston 29. The floating piston 29 carries a seal 31 for sealing with the cylinder bore 23 so as to separate the chambers 28H and 28G from each other. The chamber 28G is filled with an inert gas such as nitrogen that is contained under pressure for a reason which will be described.

The piston 26 is connected to a piston rod 32 by means of a nut 33 and further assembly which will be described by reference to FIGS. 4 and 5. The piston rod 32 extends through the hydraulic chamber 27 and beyond an end closure assembly, indicated generally by the reference numeral 33, which forms a closure for this end of the shock absorber 21 and specifically which seals the chamber 27. This end closure includes an end cap 35 which retains a dust seal 36 in place. An oil seal 37 has a bushing 38 which encircles and seals the piston rod 32 so as to permit movement between the cylinder 22 and the piston rod 32.

In this regard, the upper end of the piston rod 32 may be connected to a fixed element of the chassis of the motor vehicle so when the wheel moves relative to the chassis the relative movement occurs between the cylinder 22 and the piston 26 and piston rod 32 as is well known in this art.

A stopper element 39 is held relative to the end closure 34 by means of a resilient bushing 41 so as to limit the maximum degree of downward movement of the cylinder 22 relative to the piston rod 32 and piston 26.

A damping arrangement is carried by the piston 26 for controlling the flow between the chambers 27 and 28. This structure may be best understood by reference to FIGS. 4 and 5.

It will be seen that the piston 26 is provided with a first series of apertures 42 that extend axially through it from the chamber 27 to the chamber 28. These apertures 42 have their centers located on a base circle that extends around the axis of the piston rod 32 at a predetermined distance.

A first plate type flow control valve 43 cooperates with the ends of the apertures 42 adjacent the chamber 28 and act to control the flow from the chamber 27 to the chamber 28. These valve plates 43 are held in abutment with the piston 26 by the nut 33 and a spacer ring 44.

A second series of apertures 45 are provided for controlling the flow from the chamber 28 to the chamber 27.

As may be seen, the apertures 42 and 45 are staggered axially relative to each other by stepping the piston 26. As a result, the valve element 43 is free of the end of the apertures 45 so that it will not effect the flow therethrough.

A second plate type valve 46 is held in controlling relationship with the ends of the apertures 45 adjacent the fluid chamber 27. The plates of the plate-type valve 46 are held in place by a spacer ring 47 that is held in abutment with a shoulder 48 on the piston rod 32 by the piston 26 valve assembly 43, spacer 44, and nut 33.

In accordance with this embodiment, the plate-type valve 46 is of a conventional type and is comprised of a plurality of plates 46a, 46b, 46c, and 46d.

Figure 5:
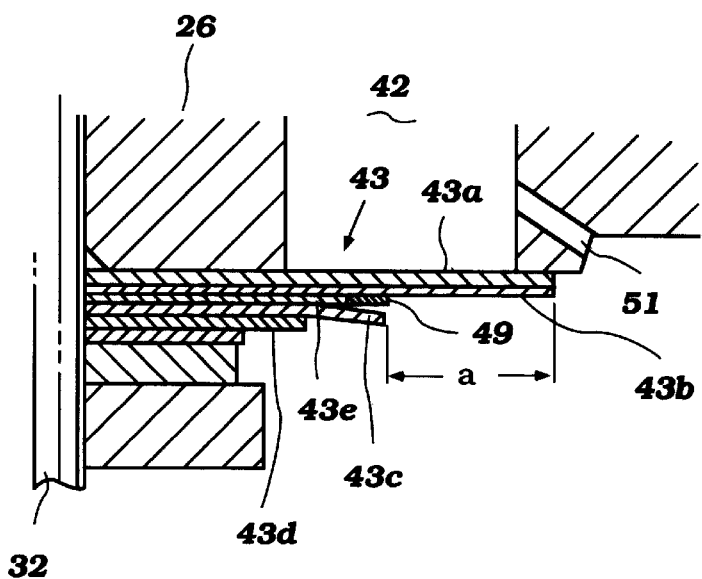
FIG. 5 is a still further enlarged cross-sectional view of the area encompassed by the circle 5 in FIG. 4.

The valve element 43 which is shown in more detail in FIG. 5 embodies the invention. It is to be understood that the construction of the valve element 43 as will be described by reference to FIG. 5 can also be employed in place of the conventional type valve element 46 if non-linear damping is required in both directions.

The valve element 43 is comprised of a plurality of plate-type valves consisting of the valve elements 43a, 43b, 43c, and 43d. However, and in accordance with the invention, a shim ring 49 is interposed between the valve plate 43b and the valve plate 43c. This shim ring 49 is preferably carried by a further valve plate 43e which is thinner than the remaining valve plates.

This shim ring 49 has its outer periphery disposed at a distance "a" from the outer periphery of the valve plates 43a and 43b and in an area which, in the illustrated embodiment, is disposed inwardly of the circle on which the axes of the apertures 42 lie. The distance a may be varied and by varying this distance and the thickness of the shim 49, the amount of pre-load resisting initial opening of the valve plate 43a may be controlled.

Figure 1:
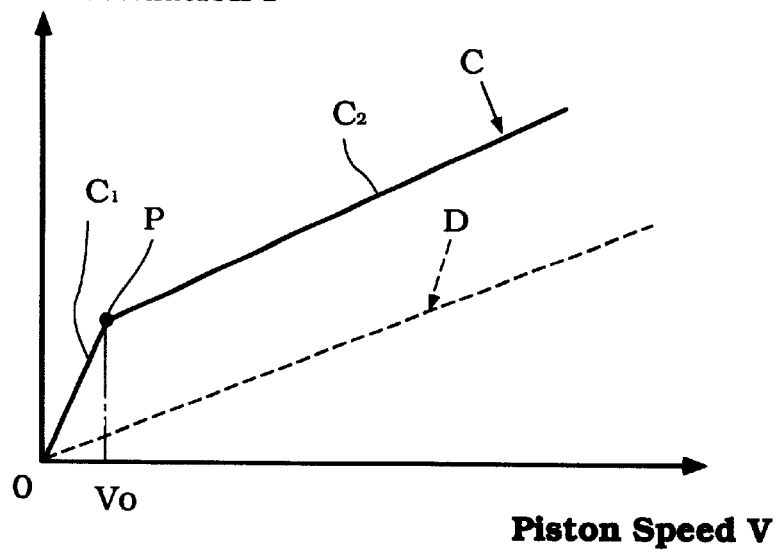
FIG. 1 is a graphical view showing the damping curves associated with two conventional type of shock absorbers with a conventional linear type shock absorber being shown by the curve D and with a variable rate-type shock absorber shown by the curve C.
Figure 6:
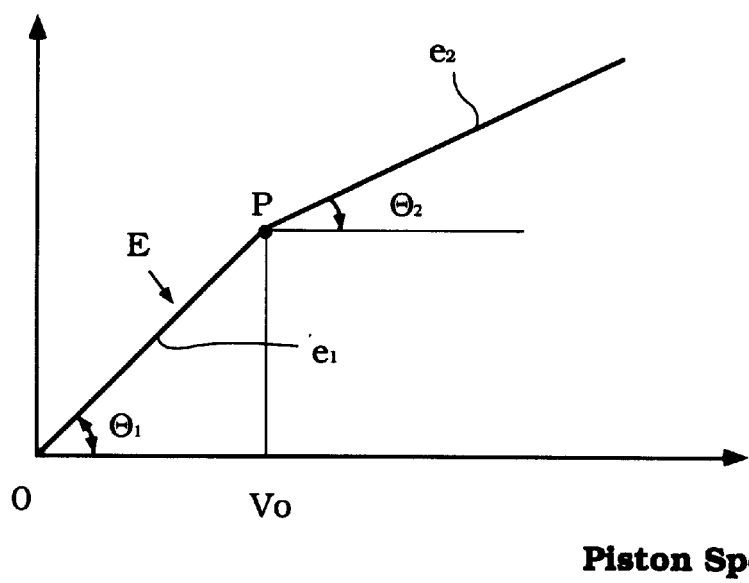
FIG. 6 is a damping curve, in part similar to FIG. 1 and shows how the damping arrangements of the shock absorber of the embodiment can be varied to suit particular required conditions.
Figure 2:
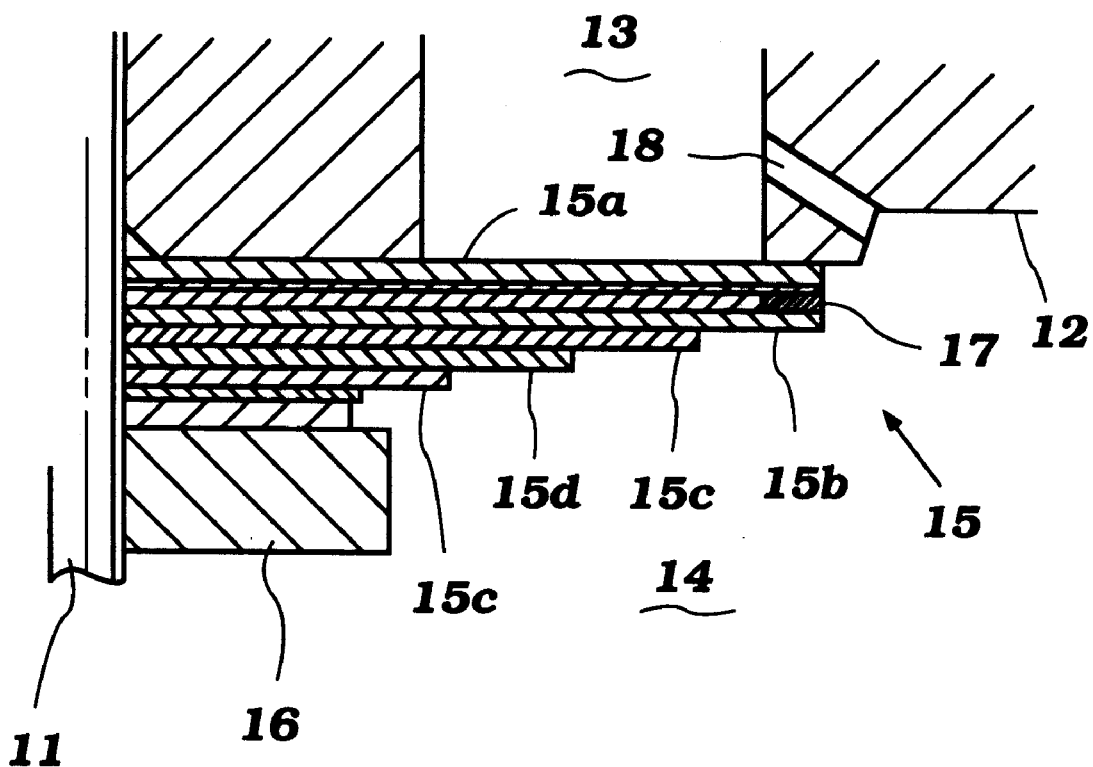
FIG. 2 is an enlarged cross-sectional view taken through a portion of a shock absorber having the type damping curve indicated at C in FIG. 1.

A bypass passage 51 extends from the apertures 42 to the chamber 28 in bypassing relationship to the valve element 43. The size of the apertures 51 determine the shape of the portion of the damping curve indicated at E1 in FIG. 6. By varying the effective flow area of the apertures 51, the slope $\theta_1$ of the damping curve e1 curve. The smaller the apertures the greater the angle $\theta_1$.

By varying the location of the shim rings 49 and their thickness, it is possible to change the inflexion point P where the damping curve e1 is replaced by the damping curve portion e2. The slope of the damping curve portion e2 depends upon the pre-load effect caused by the shim 49 and thus permits adjustment of the slope $\theta_2$ of the curve portion e2. Thus, it should be readily apparent that this invention provides a construction by which the damping characteristics of the shock absorber can be controlled quite accurately and which provides a varying damping effect and variation in the point at which the damping effect changes.

It should be noted that as the piston 26 and piston rod 32 move, there will be less fluid displaced from the chamber 27 to the chamber 28 due to the presence of the piston rod 32 in the chamber 27. This difference in volume is made up by expansion and contraction of the gas chamber 28G and the floating piston 29 as is well known in this art.

Of course, the foregoing description is that of preferred embodiments of the invention, and various changes and modifications may be made without departing from the spirit and scope of the invention, as defined by the appended claims.

What is claimed is:

1. A hydraulic shock absorber comprised of a cylinder defining a cylinder bore, a piston slidably supported in said cylinder bore and dividing said cylinder bore into first and second fluid chambers, a piston rod affixed to said piston and extending through one of said fluid chambers for connection to a first element of a suspension system, means for connecting said cylinder to a second element of a suspension system for effecting movement of said piston relative to said cylinder assembly upon suspension movement of said suspension elements, a first series of apertures extending through said piston from a first of said fluid chambers to the second of said fluid chambers, a second series of apertures extending through said piston from said second fluid chamber to said first fluid chamber, and first and second plate type valves for controlling the flow through said first and said second series of apertures, respectively, each of said plate type valves having a plurality of separate plates in stacked abutting relation to the respective series of apertures on opposite sides of said piston and to each other and biassed by their interaction to positions preventing flow through the respective series of apertures, at least one of said plate type valves comprising a shim interposed between the plates thereof for effecting deflection of those plates spaced axially away from the respective side of said piston for controlling the preload at which said one plate-type valve opens to permit flow through the respective series of apertures, said shim being an annular member interposed between said plates and having an outer diameter that is not greater than the outer peripheral edges of the series of apertures with which it is associated.

2. A hydraulic shock absorber as set forth in claim 1 wherein plates of the plate-type valves have different diameters.

3. A hydraulic shock absorber as set forth in claim 2 wherein the diameters of plates of the plate-type valves decrease in the direction away from the controlled apertures.

4. A hydraulic shock absorber as set forth in claim 3 wherein the shim is carried by a plate type element.

5. A hydraulic shock absorber as set forth in claim 4 wherein the plate type element that carries the shim has a lesser axial extent than the shim and the remaining plates.

* * * * *